Aug. 4, 1959     J. SELSING     2,898,217
CERAMIC PRODUCTS
Filed Aug. 6, 1956
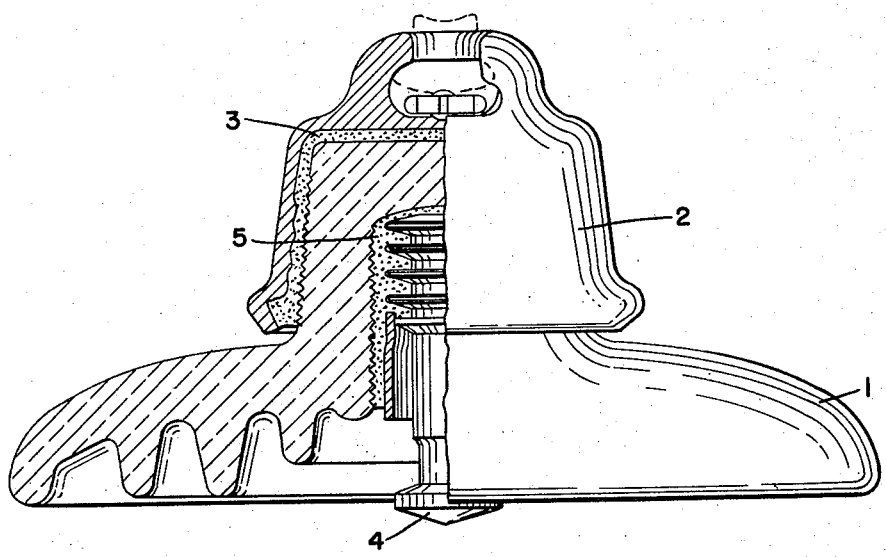
INVENTOR.
JORGEN SELSING
BY
ATTORNEY United States Patent Office 2,898,217
Patented Aug. 4, 1959

2,898,217

CERAMIC PRODUCTS

Jorgen Selsing, Barberton, Ohio, assignor to The Ohio Brass Company, Mansfield, Ohio, a corporation of New Jersey Application August 6, 1956, Serial No. 602,151

11 Claims. (Cl. 106—46)

This invention relates to ceramic products, and more particularly to electrical insulators. It includes the products themselves and their production.

Following the process of this invention, ceramic products of high electrical and mechanical strength, suitable for parts for suspension insulators and other insulators, are made from ceramic mixes, containing 15 to 45 percent of calcined alumina or its equivalent of $Al_2O_3$ and hydrates thereof. An unusually high electrical and mechanical strength is obtained by balancing the formula of the ceramic mix with nepheline syenite or other source of active sodium to keep to one percent or less the amount of quartz in the fired products.

Ceramic products for electrical insulators are usually produced commercially by preparation of ceramic mixes which after mixing may be shaped into desired articles and fired at temperatures between 1150° and 1400° C., the maximum temperature depending upon the exact composition of the prepared mix.

The ceramic mix used for electrical insulating ceramics is generally prepared from 15 to 30 percent quartz, 20 to 40 percent feldspar and 40 to 60 percent clays, the latter being a mixture of several ball and china clays. The fired products may contain 10 to 25 percent quartz and 10 to 20 percent mullite, both as crystals, and 55 to 75 percent of a glassy matrix of variable composition.

It is not unusual to add a substantial amount of calcined alumina to a ceramic mix to improve the mechanical strength of the fired ceramic products. Commercially, calcined alumina is utilized for small electrical insulators, such as spark plugs, by preparing ceramic mixes containing 80 to 99 percent calcined alumina, shaping the desired articles and firing these at temperatures above 1400° C. The final products may contain 80 to 99 percent corundum (alpha alumina crystals), the remainder being a glassy matrix of variable composition depending upon the exact composition of the original mix.

The single figure of the drawing is a side view, partly broken away, of a suspension insulator. The ceramic compositions of this invention which have a high modulus of rupture are particularly suited for making the ceramic parts of such insulators. In the drawing, the disc 1 is advantageously made of any of the ceramic compositions described in the examples. The metal cap is fastened to the disc by the adhesive 3 and the metal pin 4 is also suitably adhered to the disc 1 by adhesive 5. Taylor U.S. 2,443,435 describes such an insulator.

Calcined alumina is considerably more expensive than the other raw materials that are commonly used in large amounts in the preparation of the ceramic mixes. The use of a relatively small amount of calcined alumina will decrease the cost of the raw materials and will permit successful firing at lower and more economic temperatures. However, the use of small amounts of calcined alumina fails to improve the mechanical strength of the fired products sufficiently to make the additional expense for calcined alumina remunerative.

Ceramic mixes prepared from 15 to 45 percent calcined alumina, 20 to 40 percent feldspar and 25 to 60 percent clays, after firing to a temperature between 1150 and 1400° C., produce ceramic products containing 15 to 45 percent corundum, 10 to 20 percent mullite and 2 to 10 percent quartz. The corundum, mullite and quartz are present as crystals; the remainder as a glassy matrix of variable composition which has reduced strength because of the crystalline quartz.

The quartz content of the ceramic mix is derived from impurities in the raw materials. The commercially available ball clays that must be used to obtain sufficient plasticity in the ceramic mix contain more than 5 percent quartz, usually 20 to 40 percent quartz. Also, the commercially available feldspars contain at least 5 percent quartz as an impurity. The cost of purer raw materials makes their use prohibitive. The calcined alumina does not contain quartz. Only a small part of the amount of quartz that is added inadvertently with the raw materials in the ceramic mix is dissolved when the mix is fired to temperatures between 1150 and 1400° C., and at least 2 percent of quartz will remain in the fired products prepared from usual formulae.

The investigations of the inventor show that this small content of quartz decreases substantially the mechanical and electrical strength of fired ceramic products which are prepared from ceramic mixes of 15 to 45 percent calcined alumina, 20 to 40 percent fluxes and 25 to 60 percent clays. The increase in mechanical strength with decreasing quartz content obtained by the substitution of other fluxes for all or part of the commonly used feldspar is shown in Table I below.

Feldspar is an igneous rock that is commercially used as a flux in ceramic bodies. This material generally contains the minerals orthoclase ($KAlSi_3O_8$), albite ($NaAlSi_3O_8$) and quartz ($SiO_2$). The chemical analysis of such a feldspar may be 68 percent silica, 17 percent alumina, 3 percent soda and 11 percent potash. The content of alkalis (soda and potash) causes a mild dissolving effect on quartz in ceramic products when fired to temperatures between 1150 and 1400° C., but is not sufficient to decrease the amount of quartz below 2 percent in a fired ceramic product made from a ceramic mix containing in the range of 15 to 45 percent calcined alumina, 20 to 40 percent feldspar and 25 to 60 percent clays.

It has been found that an improvement on the dissolving effect of the fluxes on quartz during firing is obtained by increasing the amount of active soda in the fluxes. A flux containing soda and silica in the ratio 1 part of active soda to 10 parts of silica is almost in equilibrium at the firing temperature. If it contains an excess of soda above the aforesaid ratio, the excess will dissolve quartz. Potash will have a similar effect, but the reaction between potash and silica is so slow that it does not dissolve any appreciable amount of quartz in the relatively short time required for the commercial firing of ceramic products, and the cost of an extension of the firing time makes the process prohibitively expensive.

To obtain a soda/silica ratio in excess of 1/10 it is necessary to add sodium compounds to the mix. Most sodium compounds are soluble in water, and as such cannot be used in a ceramic mix, because water is added to this mix in the common commercial procedure. When the water is partly removed from the original slurry by filter pressing, soluble additives, such as soluble sodium compounds, are carried away.

Nepheline syenite is particularly suited as a source of active soda, because it is almost completely insoluble in water, and it is not expensive. It is an igneous rock, composed chiefly of the mineral nephelite $$(Na_6K_2Al_8Si_9O_{34})$$

mixed with orthoclase (KAlSi$_3$O$_8$) and albite
(NaAlSi$_3$O$_8$)

The native rock does not contain quartz. The commercially available nepheline syenite contains about 60 percent silica, 24 percent alumina, 10 percent soda and 5 percent potash. Thus the soda/silica ratio is about 1/6.

Instead of nepheline syenite other sodium silicates which contain a soda/silica ratio in excess of 1/10 may be used. In feldspars the ratio is only 1/20. Cheap artificial glasses may be made in which the ratio is sufficiently high to reduce the quartz content of the mix.

The difference in the effect of feldspar and nepheline syenite used in different ratios is illustrated in the following table where the modulus of rupture (obtained by a method similar to ASTM-C369-55T but used on test bars of ⅞ inch diameter with the loading applied at the rate of 3000 pounds per square inch per minute, using a 3-inch span) for each different ratio is given. The modulus of rupture to which the claims refer was determined by this modified method. Each of the ceramic mixes was prepared as in Example 2, below, except for the varying ratio between the feldspar and nepheline syenite.

TABLE I

| Weight Ratio, Nepheline Syenite: Feldspar in Ceramic Mix | Percent Quartz in Fired Product | Modulus of Rupture (p.s.i.) |
|---|---|---|
| 0:35 | 3.0 | 16,000 |
| 15:20 | 1.2 | 17,800 |
| 20:15 | 0.6 | 19,200 |
| 25:10 | 0.5 | 19,500 |
| 30:5 | 0.2 | 20,100 |
| 35:0 | 0.0 | 23,600 |

The dissolving effect of active soda is enhanced by the addition of alkaline earth oxides to the ceramic mix. Their presence lowers the melting point of the reaction product and thus hastens the reaction of the soda-containing compound with the quartz and thereby increases the amount of quartz with which a given amount of active soda will react during the firing period. The carbonates, hydroxides and sulfates of magnesium, calcium, barium and strontium are transformed to the oxides at firing temperatures in the range of 1150 to 1400° C., when in the presence of silicates, and dissolve quartz that is present. Their use is particularly effective when nepheline syenite or both feldspar and nepheline syenite are present in the fluxes. The amount of alkaline earth oxide in the mix should not total more than 10 percent of the total flux.

The following examples illustrate the invention. They all relate to the firing of mixes containing 15 to 45 percent alumina at 1150 to 1400° C. and the production of ceramic products with a modulus of rupture of at least 18,000 pounds per square inch. This high strength is due to the low quartz content of the products which is no more than one percent for each, although the quartz in the mix before firing is substantially greater than one percent. In Example 1, nepheline syenite is the only flux material. In Example 2, feldspar is used alone with the nepheline syenite. In Example 3 several percent of an alkaline earth compound is used with nepheline syenite alone, and in Example 4 the flux contains feldspar also. Example 5 uses a higher content of alumina and a higher modulus of rupture is obtained, although the higher alumina content makes the product more expensive. The quartz content of the product of Example 3 is extremely low. Ordinarily, a somewhat higher quartz content, not in excess of one percent, is satisfactory, and, ordinarily, this is obtained with mixes of 20 to 25 percent calcined alumina and at least 15 percent nepheline syenite fired at 1150 to 1250° C. The first example gives rather detailed instructions for proceeding, familiar to the man skilled in the art, which are not repeated in the following examples, although the same general procedure is employed in carrying out each of the examples.

*Example 1*

A ceramic mix is prepared from 25 percent calcined alumina, 25 percent nepheline syenite and 50 percent clays, the latter being a mixture of 60 percent china clay and 40 percent ball clay. The materials may be used as finely ground materials, or, the mix may be ground during or after the mixing process. Before the mixing process, water is added in sufficient amount to make a slurry, usually called a body slip, in order to ease the mixing process. After mixing the body slip is filter-pressed to produce a material containing about 20 percent water. This material is shaped by the commercially used forming processes into ceramic articles of desired shape. A glaze may be applied to the articles if so desired. These ceramic articles are fired in kilns to a temperature of about 1200° C. After firing, the fired ceramic products may or may not be assembled with appropriate metal parts, according to the final use.

The mechanical strength of this ceramic product, measured as the modulus of rupture, according to the method mentioned, is 22,000 pounds per square inch. The quartz content of this ceramic product, measured by X-ray analysis, is 0.1 percent.

The content of active soda in nepheline syenite makes it possible to utilize fluxes containing part feldspars and part nepheline syenite. Fluxes that contain more than 50 percent feldspars will generally have a soda/silica ratio lower than 1/10 and thus they do not contain a sufficient amount of active soda to reduce the quartz content of fired products produced from raw materials of the usual commercial purity to a maximum of one percent. The foregoing table, which illustrates the effect of using feldspar and syenite in different ratios, includes as the third entry the product produced according to the following example:

*Example 2*

A ceramic mix is prepared from 20 percent calcined alumina, 15 percent feldspar, 20 percent nepheline syenite, 25 percent china clay and 20 percent ball clay and ceramic products are made by the procedure of Example 1. They contain 0.6 percent quartz and show a mechanical strength, measured as modulus of rupture, of 19,200 pounds per square inch.

*Example 3*

A ceramic mix containing 18 percent calcined alumina, 35 percent nepheline syenite, 2 percent calcium carbonate, 25 percent china clay and 20 percent ball clay is made into ceramic products, that, after firing to 1150° C. contain 0.05 percent quartz and show a mechanical strength of 25,000 pounds per square inch measured as modulus of rupture.

*Example 4*

A ceramic mix is prepared from 20 percent calcined alumina, 15 percent feldspar, 15 percent nepheline syenite, 5 percent calcium carbonate, 25 percent china clay and 20 percent ball clay. After firing to 1175° C., it yields a ceramic product containing 0.4 percent quartz and having a mechanical strength of 21,500 pounds per square inch, measured as the modulus of rupture.

*Example 5*

A ceramic mix prepared from 40 percent calcined alumina, 20 percent nepheline syenite, 2 percent magnesium oxide, 18 percent china clay and 20 percent ball clay, after firing to 1160° C. yields a ceramic product containing 0.2 percent quartz and having a mechanical strength of 26,000 pounds per square inch, measured as the modulus of rupture.

Example 4 shows that in mixes which contain oxides (or carbonates, hydroxides and sulfates) of alkaline earths, the flux may contain less than 50 percent of nepheline syenite. Mixes in which as little as 25 percent of the total flux is nepheline syenite give satisfactory results.

The dielectric strength, measured as the puncture voltage of concave discs, 1½ inches in diameter and with a minimum thickness of 0.1 inch, with painted silver electrodes, follows the increase or decrease in mechanical strength for these ceramic products, although with smaller relative variations. A ceramic product made as in Example 1, shows a puncture strength of 750 kilovolts per inch, corresponding to about 700 kilovolts per inch for a similar ceramic product where feldspar is used as the flux instead of nepheline syenite. The products of all four examples have high insulating properties and are very satisfactory for use in insulators.

The firing temperatures of all of the aforementioned ceramic mixes will depend upon the exact composition of the mix in question. In firing a ceramic electrical insulator a dense vitrified product is wanted. Ceramic mixes that contain a large amount of fluxes in relation to the other ingredients will vitrify at lower temperatures than ceramic mixes that contain relatively small amounts of fluxes. All the aforementioned ceramic mixes will vitrify to dense ceramic products within the temperature range of 1150 to 1400° C.

Calcined alumina, $Al_2O_3$, is commercially produced by calcination of aluminum hydroxide and aluminum oxide compounds. The invention may be applied to ceramic mixes that contain aluminum oxide, $Al_2O_3$, or aluminum hydroxide, $Al(OH)_3$, or other hydroxide of aluminum as a substitute for all or part of the calcined alumina, because aluminum oxide and its hydroxides are transformed into corundum during the firing of the ceramic product.

Artificially made glasses composed essentially of soda and silica, with the soda content in excess of one-tenth of the silica content, may replace all or part of the nepheline syenite in the aforesaid ceramic mixes, as they have a similar power of dissolving quartz during firing of the ceramic products.

All of the foregoing examples are illustrative. The invention is covered in the claims which follow.

What I claim is:

1. The process of producing a ceramic product having a quartz content of no more than 1 percent of the weight of the product, which comprises firing at a temperature between 1150 and 1400° C. a ceramic mix composed essentially of 15 to 45 percent of an aluminum compound of the class consisting of $Al_2O_3$ and hydrates thereof, 25 to 60 percent of clay and 20 to 40 percent of flux, the mix containing in excess of 1 percent of quartz present as impurity in the raw materials, and the flux containing sufficient sodium silicate in which the ratio of the soda to the silica is at least 1 to 10, to reduce the quartz content, on firing, to no more than 1 percent.

2. The process of claim 1 in which the flux is at least largely nepheline syenite.

3. The process of claim 1 in which the flux contains a substantial amount of nephelite ($Na_6K_2Al_8Si_9O_{34}$).

4. The process of claim 1 in which the flux contains a substantial amount of an alkaline earth compound of the class consisting of the carbonates, hydroxides and sulfates of magnesium, calcium, barium and strontium, the content of alkaline earth oxide of such compound being no more than 10 percent of the flux.

5. The process of claim 1 in which the flux contains substantial amounts of nepheline syenite and an alkaline earth compound of the class consisting of the carbonates, hydroxides and sulfates of magnesium, calcium, barium and strontium, the content of alkaline earth oxide of such compound being no more than 10 percent of the total flux.

6. The process of claim 1 in which the flux contains substantial amounts of feldspar, nepheline syenite and an alkaline earth compound of the class consisting of the carbonates, hydroxides and sulfates of magnesium, calcium, barium and strontium, the content of alkaline earth oxide of such compound being no more than 10 percent of the total flux.

7. The process of claim 1 in which the aluminum compound is at least largely calcined alumina.

8. The process of claim 1 in which the mix contains 20 to 25 percent of calcined alumina and at least 15 percent of nepheline syenite, and the composition is fired at 1150 to 1250° C.

9. A fired ceramic product which is composed essentially of mullite, corundum and a glassy matrix, and which is composed of 15 to 45 percent of corundum and contains no more than 1 percent of quartz.

10. A ceramic insulator which is composed essentially of mullite, corundum and a glassy matrix, and which is composed of 15 to 45 percent of corundum and contains no more than 1 percent of quartz and has a modulus of rupture of at least 18,000 pounds per square inch.

11. A suspension insulator which includes a ceramic part composed essentially of mullite, corundum and a glassy matrix, and which is composed of 15 to 25 percent of corundum and contains no more than 1 percent of quartz and has a modulus of rupture of at least 18,000 pounds per square inch.

References Cited in the file of this patent

UNITED STATES PATENTS

| | | |
|---|---|---|
| 1,343,040 | Dantsizen | June 8, 1920 |
| 1,438,598 | Jeffery | Dec. 12, 1922 |
| 1,712,005 | Lambie et al. | May 7, 1929 |
| 2,045,318 | Stribeck | June 23, 1936 |
| 2,047,345 | Weis | July 14, 1936 |
| 2,334,319 | Erdle | Nov. 16, 1943 |
| 2,419,290 | Schaefer | Apr. 22, 1947 |

OTHER REFERENCES

Ceramic Abstracts, Koenig, vol. 19, No. 7 (1940) (page 167).

Ceramic Abstracts, Phillipson, January 1948 (page 16).

Koenig: Journal Am. Cer. Society, vol. 38, No. 7, 1955.